United States Patent [19]
Feig et al.

[11] Patent Number: 5,909,254
[45] Date of Patent: Jun. 1, 1999

[54] DIGITAL IMAGE PROCESSOR FOR COLOR IMAGE TRANSMISSION

[75] Inventors: Ephraim Feig, Briarcliff Manor; Elliot Linzer, Bronx, both of N.Y.

[73] Assignee: International Business Machines Corporation, Armonk, N.Y.

[21] Appl. No.: 08/117,971

[22] Filed: Sep. 8, 1993

Related U.S. Application Data

[63] Continuation of application No. 07/922,295, Jul. 30, 1992, abandoned.

[51] Int. Cl.$^6$ ...................................................... H04N 9/67
[52] U.S. Cl. ............................................. 348/660; 348/720
[58] Field of Search ............................... 358/133, 13, 30, 358/11, 12, 15, 40; 348/659–661, 713, 720; H04N 9/67

[56] References Cited

U.S. PATENT DOCUMENTS

| | | | |
|---|---|---|---|
| 4,504,860 | 3/1985 | Nicol et al. ............................... | 358/133 |
| 4,597,005 | 6/1986 | Baleshta et al. .......................... | 358/12 |
| 4,743,960 | 5/1988 | Duvic et al. .............................. | 358/13 |
| 4,812,904 | 3/1989 | Wagensonner et al. .................. | 358/80 |
| 4,831,434 | 5/1989 | Fuchsberger .............................. | 358/40 |
| 4,857,992 | 8/1989 | Richards ................................... | 358/13 |
| 4,991,122 | 2/1991 | Sanders .................................... | 364/521 |
| 5,079,621 | 1/1992 | Daly et al. ................................ | 358/13 |
| 5,162,898 | 11/1992 | Aono ........................................ | 358/13 |
| 5,220,412 | 6/1993 | Oka .......................................... | 358/30 |

FOREIGN PATENT DOCUMENTS

| | | | |
|---|---|---|---|
| 63-87876 | 4/1988 | Japan . | |
| 63-207292 | 8/1988 | Japan . | |
| 2-63290 | 3/1990 | Japan . | |
| 2-222386 | 9/1990 | Japan . | |
| 0187698 | 8/1991 | Japan ......................... | H04N 11/040 |

OTHER PUBLICATIONS

"Adaptive Coding of Monochrome and Color Images", W–H. Chen and C. Harrison Smith, IEEE Trans. on Comm., vol. COM–25, No. 11, Nov. 1977, pp. 1285–1292.

"NTSC Luminance/Chrominance Equation Definition For Digital Systems", IBM Tech. Discl. Bulletin, vol. 32, No. 10A, Mar., 1990, pp. 208–209.

"Default RGB Color Palette With Simple Conversion From YUV", IBM Tech. Discl. Bulletin, vol. 33, No. 5, Oct., 1990, pp. 200–205.

"Lower Entropy Basis Functions For Continuous Tone Color Images", IBM Tech. Discl. Bulletin, vol. 34, No. 3, Aug., 1991, p. 144.

"Image Capture And Scan Conversion System", Disclosed Anonymously, Research Disclosure, Dec. 1991, No. 332, Kenneth Mason Publications, Ltd. England.

*Primary Examiner*—David E. Harvey
*Attorney, Agent, or Firm*—Daniel P. Morris

[57] ABSTRACT

A method and apparatus for increasing the processing speed or decreasing circuit complexity (or both) of a digital image processor by eliminating the conventional multiplication operation from the RGB to YUV and YUV to RGB transforms having NTSC compatible equation coefficients. In particular, the change of color-basis matrix for converting RGB data to obtain YUV data is factored into a scale factor and a coefficient matrix. The coefficient matrix contains coefficients such that its product with the RGB input vector can be performed using only seven binary additions and five shift operations. This process effectively removes the conventional multiplication operations from the RGB to YUV conversion. The scale factor is conveniently absorbed into the quantization of the YUV data before transmission. The quantization process includes a multiplication already and the two multiplication steps are folded into one step. Therefore, the absorption of the scale factor into the quantization step does not increase the processing time because no multiplication steps are added. This process of factoring the transform matrix is also applied to the inverse transform process. In the inverse transform process the change of color-basis matrix for converting YUV data to RGB data is such that its implementation reduced to five addition steps and two shift steps, again effectively eliminating the conventional multiplication operations. Also, the diagonal matrix is absorbed into the descaling process so that no multiplication steps are added to the inverse transform process.

50 Claims, 2 Drawing Sheets

DIGITAL IMAGE PROCESSOR FOR COLOR IMAGE TRANSMISSION

This is a continuation of application Ser. No. 07/922,295, filed Jul. 30, 1992 now abandoned.

FIELD OF THE INVENTION

This invention relates generally to the field of image processing. In particular, this invention relates to methods and apparatus for digitally representing images and transmitting digital representations of images. More specifically, this invention relates to a method and apparatus for converting RGB coded images into YUV coded images and conversely for converting YUV coded images into RGB coded images.

BACKGROUND OF THE INVENTION

The display and transmission of visual images is increasingly important for modern communications. In particular, it is important for modern computer driven displays to receive, transmit, and display sequences of images in rapid succession such as is shown in movies. The quality of the visual display can be improved by representing the visual images in a digital format. Generally, a visual image can be represented by dividing the image into sufficiently small picture elements, called pixels, and assigning to each pixel a color and a value representing the intensity of the color for the pixel. For example, a typical 8 inch by 10 inch visual image may be divided into a two dimensional array of 768 by 1024 pixels wherein each pixel is further divided into 3 subpixels. The three subpixels are each associated with one of the three primary colors red, green, or blue. Each subpixel is assigned a digital value corresponding to the intensity level for the color of the subpixel. The subpixels are small enough such that the human eye does not resolve each subpixel. Rather, the image presented by a pixel to the viewer is some combination of the three colors associated with each subpixel weighted by the intensity value for each subpixel color. As a result, the visual image is represented by three two dimensional matrices of intensity values.

This digital image represents a high quality image because the pixels are small. However, as the pixel gets smaller, there are more pixels for the same size image and more intensity values to store, manipulate, and transmit. The fact that more pixels requires more data also results in a reduction in the ability to transmit images because the amount of data for each image transmitted is so large. As a result, various efforts have been made to transform RGB data into another form of data which can be transmitted and stored efficiently and which can also be re-transformed back into RGB data for display. The new form of data most often chosen relates the RGB data to a luminance value and two chrominance values. In particular, the luminance value represents the intensity of a pixel on a grey scale which provides an accurate representation of the image to a monochrome display. The luminance value is obtained by weighting each intensity value of the RGB data and combining them. For example, the National Television Systems Committee (NTSC) standard luminance value $Y=0.299R+0.587G+0.114B$, wherein R is the red intensity value, G is the green intensity value, and B is the blue intensity value. The two chrominance values convey information which describes how the colors differ from monochrome. For example, the NTSC values are $U=Y-B$ and $V=Y-R$. The RGB to YUV transform compacts most of the visual intensity information into the luminance variable. This effect is similar to viewing a color image on a monochrome monitor in that the viewer understands a significant portion of the image but does not understand it all. This effect is useful for reducing the amount of data representing the image because the YUV data can be digitally filtered and coded such that much of the chrominance data can be discarded and replaced with code values while the filtered and coded YUV data is still an accurate representation of the digitized image.

The Ensuing digital filtering eliminates unneeded data typically includes block transformations of each of the separate YUV components using a technique such as discrete cosine transforms (DCT). That is, each of the YUV components are subdivided into blocks of data which is then filtered. The output of the DCT filter is then further compressed through a coding technique. In addition to the DCT filter, the blocks of DCT output data are subsampled (typically 2-to-1 or 4-to-1) in the horizontal or vertical (or both) directions. Generally, not all the DCT output data is subsampled, but rather only the DCT output from the chrominance components are subsampled. The DCT output from the luminance component is generally left intact because it contains most of the image data.

The basic problem with the RGB to YUV transform is that even though the YUV form of the data can be conveniently filtered and compacted, transforming the RGB data into the YUV form requires several multiplications, additions and/or subtractions. This is a problem because each multiplication, addition or subtraction requires time for a computer processor to implement. Processing multiple operations for each pixel and processing thousands of pixels per image requires a significant amount of processor time. This amount of processor time can be large enough to degrade the rate at which sequential images can be displayed. One prior art solution to this problem is to replace the multiplication operations with look up tables. This may increase the speed of the RGB to YUV transformation because look up tables may reduce the time required for multiplication operations which often are much slower than additions or subtractions. Multiplications are often slower than additions or subtractions because multiplications in the binary number system are typically a series of bit shift and add operations so that the time for each multiplication is a multiple of an add operation. Also, special purpose multiplication hardware is much more complex than special purpose fixed point addition, subtraction and shift hardware. Even though a look up table decreases the number multiplication operations, the look up table itself is not very fast. Moreover, many computer processors are very efficient in using the time between multiplication steps when performing many multiplications because of the pipelined structure of the processor. When look up tables are used in conjunction with computer processors, the pipelined structure can be disrupted and the overall efficiency of processing the RGB to YUV transform decreased even though the individual look up table operation is faster than the multiplication operation. Therefore, look up tables have not been very successful in increasing the speed of the RGB to YUV transform.

Another prior art technique for reducing the number of multiplications in an RGB to YUV transform is to rearrange the coefficients in the equations such that the multiplications are by factors of two. This is efficient because multiplication by a factor of two in a binary number system merely means bit shifting a number which is very fast. For example, if $Y=0.25R+0.5G+0.25B$, then the product of 0.25 and R can be achieved by bit shifting R two places to the right rather than actually multiplying the numbers. This bit shift operation significantly improves the speed of the RGB to YUV transformation by minimizing the multiplication time without changing the hardware. The problem with this technique is that the NTSC coefficients are chosen based on the sensitivity of the human eye. The human eye does not react equally to each of the three primary colors nor in proportion to the intensity of the three primary colors. This means that significantly changing the transform coefficients changes the effectiveness of the luminance variable. Such a color space change of variables may be significantly less effective for compression.

OBJECTS OF THE INVENTION

It is an object of the present invention to manufacture an improved digital image processor.

It is a further object of the present invention to manufacture a faster digital image processor.

It is still another object of the present invention to manufacture a digital image processor having a faster RGB to YUV transform.

It is still a further object of the present invention to manufacture a digital image processor having a faster RGB to YUV transform which closely approximates National Television Systems Committee video signal luminance and chrominance equations.

It is still another object of the present invention to manufacture a digital image processor having an RGB to Y'U'V' transform which closely approximates a scalar multiple of the National Television Systems Committee video signal luminance and chrominance equations.

It is still another object of the present invention to manufacture a digital image processor having an RGB to Y'U'V' transform which requires no multiplications.

It is still another object of the present invention to manufacture a digital image processor having a faster YUV to RGB transform.

It is still a further object of the present invention to manufacture a digital image processor having a faster YUV to RGB transform which closely approximates National Television Systems Committee video signal luminance and chrominance equations.

It is still another object of the present invention to manufacture a digital image processor having a faster YUV to RGB transform in which the time required for multiplication processes is reduced.

It is still another object of the present invention to manufacture a digital image processor having a Y'U'V' to RGB transform which requires no multiplications.

SUMMARY OF INVENTION

The present invention improves the processing speed of a digital image processor by eliminating the conventional multiplication operation from the RGB to YUV and YUV to RGB transforms having equation coefficients nearly identical to those of NTSC. In particular, the matrix multiplied by the vector $(RGB)^t$ to obtain YUV data is factored into a diagonal matrix and a coefficient matrix. The coefficient matrix contains coefficients which can be multiplied by the $(RGB)^t$ vector using only seven binary additions and five shift operations. This process effectively removes the conventional multiplication operation from the RGB to YUV transform. The diagonal matrix is conveniently absorbed into the quantization of the filtered YUV data before transmission. The quantization process includes an existing multiplication step and the quantization and RGB to YUV transform multiplication steps are folded into one step. Therefore, the absorption of the diagonal matrix into the quantization step does not increase the processing time because no multiplication steps are added. This process of factoring the transform matrix is also applied to the inverse transform process. In the inverse transform process the matrix multiplied by the (YUV)' vector to obtain the RGB data is reduced to five addition steps and two shift steps. Again, this process effectively eliminates the conventional multiplication operation. Also, the diagonal matrix is absorbed into the descaling process so that no multiplication steps are added to the inverse transform process.

DESCRIPTION OF THE PREFERRED EMBODIMENT

Figure 1:
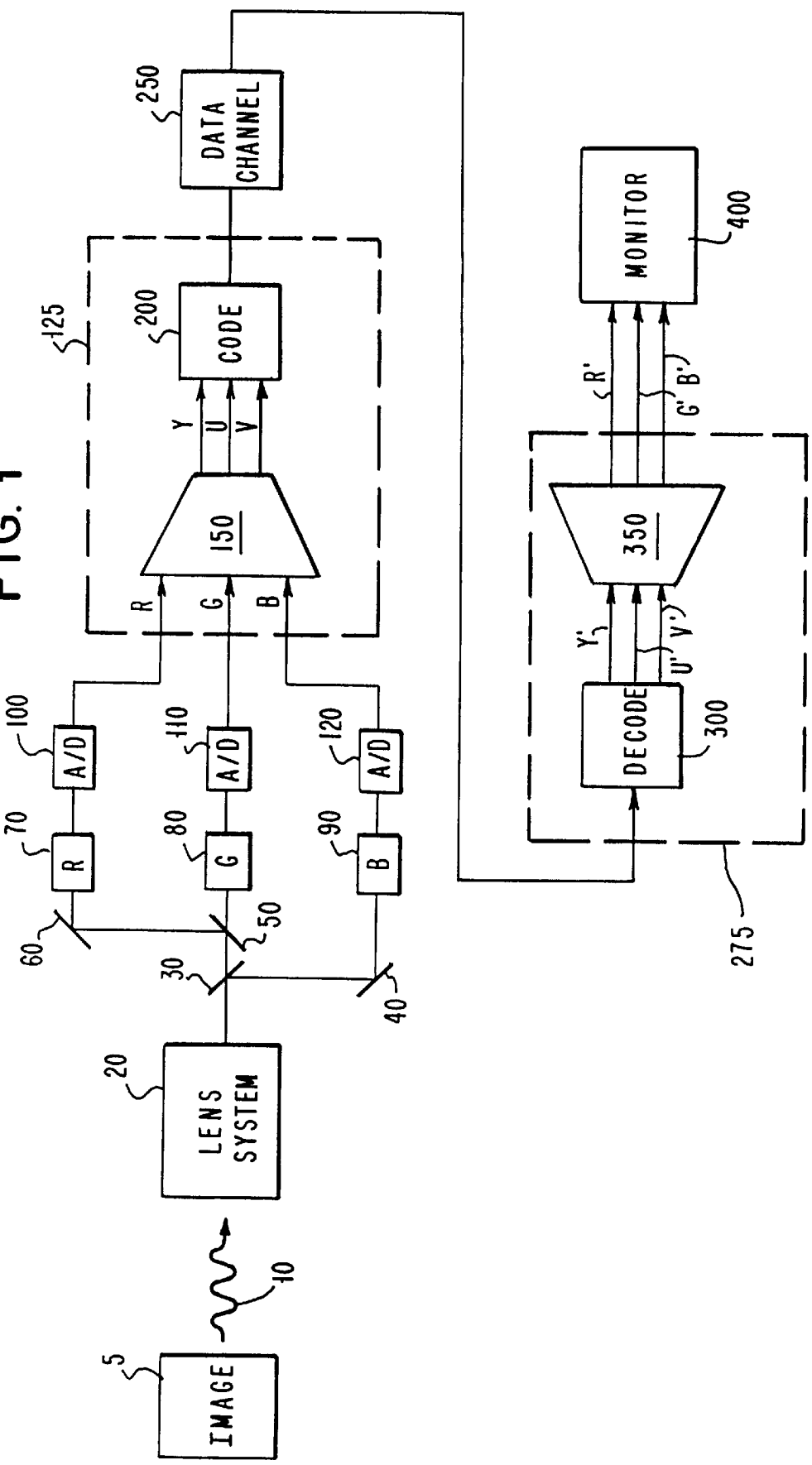
FIG. 1 illustrates one embodiment of a digital image processor system according to the present invention.

FIG. 1 illustrates one embodiment of an apparatus for the formation, transmission, and presentation of a digital image according to the present invention. Source light 10 from an image subject 5 is transmitted by a lens system 20 to a light beam mirror system. The lens system 20 generally consists of an objective lens and a condenser lens for forming the real image and a relay lens for transmitting the real image to the mirror system. The mirror system consists of a blue reflecting dichroic mirror 30 which transmits blue light to sensor means 90 by mirror 40. Similarly, the mirror system uses a red reflecting dichroic mirror 50 to transmit red light to sensor means 70 by mirror 60. The remaining green light is passed directly through the mirror system to sensor 80. Each of the sensor means is a two dimensional array of light sensitive elements in which each element senses an intensity level of the light and converts that intensity level into an analog electrical signal. Each element in the red sensor array has a corresponding element in the green and blue sensor arrays so that the addition of red, green, and blue colors having the intensity level for a particular element results in the composite light signal produced by lens system 20 for that particular element. The output of each element in the two dimensional array of sensor elements is sent to an analog to digital (A/D) converter. The analog signals produced by red sensor means 70 is sent to A/D converter 100, the output of green sensor means 80 is sent to A/D converter 110, and the output of blue sensor means 90 is sent to A/D converter 120. The A/D converters convert the analog signals into a two dimensional matrix of digital values representing the intensity of light for each element in the red, green, and blue sensors. The accuracy of the A/D converters in this embodiment is 8 bits but this accuracy could be a variety of values such as 4, 6, or 10 bits. The A/D converters create data for one two dimensional matrix having one value of a given accuracy for each element in the matrix for each of the three colors red, green, and blue. The creation of the matrices of digital values representing the color sensor outputs, called RGB data, can be created in a variety of conventional methods other than described above. For example, scanning means or artificial creation of the color data generated by conventional computers are typical methods of generating the RGB data. All of these methods have in common the fact that the RGB data is a representation of a physical measurement of light intensity for each element of the two dimensional array of color sensor elements.

Once the RGB data has been created, the data is transformed and coded. In particular, the RGB data is transformed into YUV data in which the Y value represents the luminance value of the composite RGB data for a single element in the two dimensional array in the corresponding red, green, and blue sensors. Also, the U and V values are proportional to the (Y—blue) and (Y—red) values, respectively, of the composite RGB data for a single element in this two dimensional array. The three two dimensional matrices containing digital RGB data are converted into three two dimensional matrices in which one matrix has Y data, one matrix has U data, and one matrix has V data. The RGB data is transformed into YUV data by transform means 150 because YUV data can be coded for transmission more efficiently than RGB data. In particular, RGB data transformed into YUV data is sent to code means 200 which selectively filters the data, quantizes the filtered data, and encodes the quantized filtered data for transmission. The selective filtration of the YUV data is accomplished through a filter means such as a discrete cosine transform (DCT).

After the YUV data has been filtered it is then quantized. The quantization scales the filtered YUV data and then rounds the scaled data off to the nearest binary integer. The filter-quantization procedure selectively reduces the amount of YUV data required to recreate an image. The RGB to YUV transform compacted a substantial amount of visual information into the luminance variable for each element of the two dimensional array so that much of the U and V data is not required to recreate the visual image. The DCT filter further compacts the visual information into relatively few output values. The ensuing quantization systematically removes filtered YUV data which is not required to accurately reproduce the image. The entire filter-quantization step is required because it is more efficient to transmit a large volume of data having a scaled distribution rather than a large volume of random data. The quantization process contains a multiplication step in which each filtered vector of YUV data is multiplied by a constant which scales the YUV data. Finally, the quantized scaled data is encoded for digital transmission by a process such as a Huffman coding process and then the coded data is converted into electrical or optical signals which are transmitted over a data channel 250. The Huffman (or similar) coding procedure compresses the quantized YUV data into a serial bit stream which can be conveniently transmitted. Conventional electrical conversion devices then convert the serial bit stream into electrical signals which are then applied to electrical transmission wires for carrying the electrical signals. The code to signal conversion devices could also be optical or electromagnetic devices which transform the serial bit stream into optical or electromagnetic signals which would then be applied to the optical media (such as fiber optic cables) or electromagnetic media (such as the atmosphere).

Data channel 250 comprises a transmitter, receiver, and interconnection media. The interconnection media can be electrical or optical, or can be merely atmospheric in the case of satellite transmission. Conventional data transmitters transmit data through the interconnection media to a conventional data receiver which sends the data to a decoding unit. The encoding and filtering process associated with the code means 200 are reversible through the decoding means 300. The decoding means decodes the encoded data and performs an inverse DCT (IDCT) on the decoded data. The IDCT generates Y'U'V' data which is similar to but not the same as the YUV data which started the process. Both the Huffman coding and the DCT of code means 200 can be inverted, however the quantization process cannot be inverted. The quantization process cannot be reversed because once part of the data is truncated, that truncated part cannot be recovered. Therefore, when the inverse DCT (IDCT) is performed on the decoded Huffman code, the resulting Y'U'N'data is not the same as the YUV data which started the process. After the Y'U'V' data has been generated it is sent to a Y'U'V' to R'G'B' transform means 350. Transform means 350 converts the Y'U'V' data into R'G'B' data which is then sent to a monitor. The monitor 400 reproduces images from the R'G'B' data. When the quantization is sufficiently fine, then the reproduced images are perceived as essentially identical to the original images which generated the RGB data even though the RGB and R'G'B' data are different. When the quantization is coarse, then the reproduced images are perceived as degraded versions of the original images which generated the RGB data.

The transform means 150 and code means 200 form processor 125. The decoding means 300 and inverse transform means 350 form inverse processor 275. A central element to both the processor and inverse processor is the transform and inverse transform operation. Specifically, the transform means converts RGB data to Y'U'V' data according to the following function:

$$\begin{pmatrix} Y' \\ U' \\ V' \end{pmatrix} = [B] \begin{pmatrix} R \\ G \\ B \end{pmatrix}, \quad \text{wherein}$$

$$[B] = \begin{pmatrix} 2.5 & 5 & 1 \\ 2.5 & 5 & -7.5 \\ -6 & 5 & 1 \end{pmatrix}.$$

It should be appreciated that $$0.118[B] = \begin{pmatrix} .295 & .59 & .118 \\ .295 & .59 & -.885 \\ -.708 & .59 & .118 \end{pmatrix}$$

The result of 0.118 [B] is important because the NTSC color basis change is of the form $$\begin{pmatrix} Y \\ U \\ V \end{pmatrix} = \begin{pmatrix} .299 & .587 & .114 \\ .299 & .587 & -.886 \\ -.701 & .587 & .114 \end{pmatrix} \begin{pmatrix} R \\ G \\ B \end{pmatrix},$$

from which it can be seen that transform means 150 approximates a scalar multiple of the NTSC color basis change quite accurately, the scalar multiple being 0.118. Conventional transform means require several multiplications to carry out an RGB to YUV conversion. The transform means 150 of this embodiment does not require a conventional multiplication step. Rather, the product of [B] and an arbitrary vector $(RGB)^t$ can be accomplished with seven additions and five binary shifts as follows:

$a1 = 0.5R = 0.5R \text{(shift)}$ $a2 = a1 + G = 0.5R + G \text{(add)}$ $a3 = 4a2 = 2R + 4G \text{(shift)}$ $a4 = a2 + a3 = 2.5R + 5 \text{(add)}$ $a5 = a4 + B = 2.5R + 5G + B = Y \text{(add)}$ $a6=8R=8R(\text{shift})$ $a7=a6+a1=8.5R(\text{add})$ $a8=a5-a7=-6R+5G+B=U(\text{add})$ $a9=8B=8B(\text{shift})$ $a10=0.5B=0.5B(\text{shift})$ $a11=a9+a10=8.5B(\text{add})$ $a12=a5-a11=2.5R+5G-7.53=V(\text{add})$ The transform means 150 implements the above listed binary shift and add operations for each set of RGB data corresponding to a pixel for all the pixels in the two dimensional array for each image. This means that the red value for the (i,j) pixel, the green value for the (i,j) pixel, and the blue value for the (i,j) pixel are inputs for the shift and add steps which are repeated for i=0 to M and j=0 to N for an M×N pixel image. The output of the transform means consists of three matrices having M×N pixels wherein one matrix has Y' data, one matrix has U' data, and one matrix has V' data, and where Y'=Y/0.118, U'=U/0.118 and V'=V/0.118. The transform means can be composed of conventional shift and add logic units or, as implemented in this embodiment, the transform means is an arithmetic logic unit (ALU) of a conventional digital computer having instructions to carry out the above shift and add operations. The shift operations perform an easy binary multiplication step in which shifting one binary position to the left multiplies the binary value by 2 and shifting one binary position to the right multiplies the binary value by 0.5. The Y', U', and V' data for one pixel form a product vector Z. There is one product vector for each of the M×N pixels.

Once all the RGB data has been converted to Y'U'V' data, the Y'U'V' data for each pixel is sent to code means 200. The code means 200 acts on each Y', U', and V' data sets independently by filtering, quantizing, and coding the data for transmission. The filter process is a scaled Discrete Cosine Transform (SDCT) process in which pixel groups or Y'U'V' data are transformed into values which equal the standard Discrete Cosine Transform (DCT) data values times some fixed multiplicative factors. This SDCT may be a standard DCT, in case the multiplicative factors are all 1 and the transform outputs will be equal to the standard DCT outputs. The SDCT transform function decorrelate the data and weights the Y', U', and V' data such that the data to which the human eye is sensitive is compacted into relatively few values. In particular, each of the Y', U', and V' matrices of pixel values are divided up into groups of pixels. This embodiment of the invention incorporates 8×8 groups of pixels but groups of 4×4, 6×6, 12×12, or others could be used. The data within each group of 64 pixels for each matrix is replaced by SDCT transform data. For example, if X (having elements x(i,j)) represents the data within each of the 64 pixels in each of the Y', U', and V' matrices, and the SDCT is taken to be the standard DCT, then the SDCT output equals A×A$^t$ wherein A has elements a(i,j)=Q$_i$ cos [π(2j+1)i/2N] for i,j=0,1,2, ... N-1 and for Q$_0$=1/√N and Q$_i$=√2/√N when i>0. The SDCT transform is repeated for each group of 64 pixels in each matrix of Y', U', and V' data. The SDCT can be implemented in a variety of embodiments.

The present embodiment of the scaled-DCT is based on the following matrix identities:

$C_8 = P_8 D_8 R_{8,1} M_8 R_{8,2},$ where $C_8$ is the matrix of the 8-point Discrete Cosine Transform, $$P_8 = \begin{pmatrix} 1 & 0 & 0 & 0 & 0 & 0 & 0 & 0 \\ 0 & 0 & 0 & 0 & -1 & 0 & 0 & 0 \\ 0 & 0 & 1 & 0 & 0 & 0 & 0 & 0 \\ 0 & 0 & 0 & 0 & 0 & -1 & 0 & 0 \\ 0 & 1 & 0 & 0 & 0 & 0 & 0 & 0 \\ 0 & 0 & 0 & 0 & 0 & 0 & 0 & -1 \\ 0 & 0 & 0 & 1 & 0 & 0 & 0 & 0 \\ 0 & 0 & 0 & 0 & 0 & 0 & 1 & 0 \end{pmatrix},$$

$D_8$ is the 8×8 diagonal matrix whose diagonal elements are, in sequence from top left to bottom right, ½ times 2γ(0), γ(4), γ(6), γ(2), γ(5), γ(1), γ(3), γ(7) where γ(k)=cos (2πk/32), $$R_{8,1} = \begin{pmatrix} 1 & 0 & 0 & 0 & 0 & 0 & 0 & 0 \\ 0 & 1 & 0 & 0 & 0 & 0 & 0 & 0 \\ 0 & 0 & 1 & 1 & 0 & 0 & 0 & 0 \\ 0 & 0 & -1 & 1 & 0 & 0 & 0 & 0 \\ 0 & 0 & 0 & 0 & 1 & 1 & -1 & 0 \\ 0 & 0 & 0 & 0 & -1 & 1 & 0 & 1 \\ 0 & 0 & 0 & 0 & -1 & -1 & -1 & 0 \\ 0 & 0 & 0 & 0 & 1 & -1 & 0 & 1 \end{pmatrix},$$

$$M_8 = \begin{pmatrix} 1 & & & & & & & \\ & 1 & & & & & & \\ & & 1 & & & & & \\ & & & \gamma(4) & & & & \\ & & & & 1 & & & \\ & & & & & \gamma(4) & & \\ & & & & & & \gamma(6) & \gamma(2) \\ & & & & & & -\gamma(2) & \gamma(6) \end{pmatrix},$$

$R_{8,2} = B_1 B_2 B_3,$ with $$B_1 = \begin{pmatrix} 1 & 1 & 0 & 0 & 0 & 0 & 0 & 0 \\ -1 & 1 & 0 & 0 & 0 & 0 & 0 & 0 \\ 0 & 0 & 0 & 1 & 0 & 0 & 0 & 0 \\ 0 & 0 & 1 & -1 & 0 & 0 & 0 & 0 \\ 0 & 0 & 0 & 0 & 0 & 0 & -1 & 0 \\ 0 & 0 & 0 & 0 & -1 & 0 & 0 & 1 \\ 0 & 0 & 0 & 0 & 1 & 0 & -1 & 0 \\ 0 & 0 & 0 & 0 & 0 & 1 & 0 & 1 \end{pmatrix}$$

$$B_2 = \begin{pmatrix} 1 & 0 & 0 & 1 & 0 & 0 & 0 & 0 \\ 0 & 1 & 1 & 0 & 0 & 0 & 0 & 0 \\ 1 & 0 & 0 & -1 & 0 & 0 & 0 & 0 \\ 0 & 1 & -1 & 0 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{pmatrix},$$

-continued $$B_3 = \begin{pmatrix} 1 & 0 & 0 & 0 & 0 & 0 & 0 & 1 \\ 0 & 1 & 0 & 0 & 0 & 0 & 1 & 0 \\ 0 & 0 & 1 & 0 & 0 & 1 & 0 & 0 \\ 0 & 0 & 0 & 1 & 1 & 0 & 0 & 0 \\ 1 & 0 & 0 & 0 & 0 & 0 & 0 & -1 \\ 0 & 1 & 0 & 0 & 0 & 0 & -1 & 0 \\ 0 & 0 & 1 & 0 & 0 & -1 & 0 & 0 \\ 0 & 0 & 0 & 1 & -1 & 0 & 0 & 0 \end{pmatrix}, \text{ and}$$

$$C_8 \otimes C_8(P_8 D_8 R_{8,1} M_8 R_{8,2}) \otimes (P_8 D_8 R_{8,1} M_8 R_{8,2}) =$$
$$((P_8 D_8) \otimes (P_8 D_8))((R_{8,1} M_8 R_{8,2}) \otimes (R_{8,1} M_8 R_{8,2})).$$

From these identities it can be seen that one can compute the 2-dimensional scaled DCT on 8×8 points by first computing a product by $$(R_{8,1} M_8 R_{8,2}) \otimes (R_{8,1} M_8 R_{8,2})$$

and then incorporating the product by $$(P_8 D_8) \otimes (P_8 D_8)$$

into the scaling. This is so because $$(P_8 D_8) \otimes (P_8 D_8)$$

is a product of a diagonal matrix followed by a signed-permutation matrix. The actual scaled-DCT computation can be done following the formula obtained by rewriting $$(R_{8,1} M_8 R_{8,2}) \otimes (R_{8,1} M_8 R_{8,2})$$
$$(R_{8,1} \otimes R_{8,1})(M_8 \otimes M_8)(R_{8,2} \otimes R_{8,2}).$$

The pre and post-additions (products by $(R_{8,1} \otimes R_{8,1})$ and $(R_{8,2} \otimes R_{8,2})$) are done in row-column fashion with 128 and 288 additions respectively. The core of the 8×8 scaled DCT is the computation of the product by $M_8 \otimes M_8$, which will not be done in row-column fashion. Rather, the first, second, third, and fifth columns of the 8×8 data matrix will each be multiplied by M. Each of these will involve 2 multiplications by $\gamma(4)$ plus the product by $$G_2 = \begin{pmatrix} \gamma(6) & \gamma(2) \\ -\gamma(2) & \gamma(6) \end{pmatrix},$$

which can be done with 3 multiplications and 3 additions. The fourth and sixth columns will be multiplied by $\gamma(4)$ M. Each of these can be done with 4 multiplications by $\gamma(4)$, 2 multiplications by 2, plus the product the $\gamma(4)$ $G_2$, which can be done with 3 multiplications and 3 additions. The seventh and eighth columns will be handled simultaneously to account for the product by $G_2 \otimes M$. A 16-dimensional column vector is formed by interleaving the entries of the seventh and eighth columns. The first, second, third and fifth pairs of entries are each multiplied by $G_2$, while the fourth and sixth pairs are multiplied by $\gamma(4)$ $G_2$.

Each of these takes 3 multiplications and three additions. Finally, the seventh and eight pairs of entries are multiplied simultaneously by $G_2 \otimes G_2$, with 2 multiplications by $\gamma(4)$, 10 additions and 2 shifts, using an algorithm based on the factorization $$(G_2 \otimes G_2) =$$
$$\begin{pmatrix} 1 & 0 & 1 & 0 \\ 0 & 1 & 0 & 1 \\ 0 & 1 & 0 & -1 \\ -1 & 0 & 1 & 0 \end{pmatrix} \begin{pmatrix} -\gamma(4)/2 & \gamma(4)/2 & 0 & 0 \\ -\gamma(4)/2 & -\gamma(4)/2 & 0 & 0 \\ 0 & 0 & 1/2 & 0 \\ 0 & 0 & 0 & 1/2 \end{pmatrix} \begin{pmatrix} 1 & 0 & 0 & -1 \\ 0 & 1 & 1 & 0 \\ 1 & 0 & 0 & 1 \\ 0 & 1 & -1 & 0 \end{pmatrix}$$

Altogether entire algorithm for the 2-dimensional scaled-DCT on 8×8 points calls for 54 multiplications and 462 additions, plus 6 multiplications by ½.

This produce can also be carried out in row-column fashion, whereby the columns of X first each multiplied by A and stored as columns in temporary memory, whereupon the rows of this stored matrix are each multiplied by $A^t$ and the final result is stored in memory by row. Efficient methods for multiplications by A and $A^t$ are well known, and are called Fast Discrete Cosine Transformations; many are described in K. R. Rao and P. Yip, *Discrete Cosine Transform, Algorithms, Advantages, Applications*, pages 48–120, Academic Press, New York, 1990. This procedure can also be carried out with look-up tables, ALUs, or other devices suitable for manipulating digital data.

After the SDCT data has been generated, the SDCT data is quantized. The quantization process is a two step procedure in which the SDCT data is scaled then truncated to the nearest integer. The scaling process is a multiplication step in which each of the M×N DCT data values for each of the three Y', U', and V' matrices is multiplied by a constant which is determined experimentally and accounts for the characteristics of the human visual system. In the standard compression scheme, each of the p×p (8×8) blocks in each of the DCT transformed Y, U, and V matrices is multiplied pointwise by the reciprocal of a predetermined quantity $\gamma_{i,j}$ wherein $i,j \geq 0$ and $i,j \leq p$. The p×p matrix $(\gamma_{i,j})$ is often called the quantization matrix, and the pointwise multiplication is called scaling. The quantization matrix may vary for each of the various transformed color planes Y, U, and V. In particular for conventional DCT implementations, if the output of the DCT on a p×p block is $z_{ij}$, the block output after scaling is $b_{ij} = z_{ij} \gamma_{ij}$. The present invention utilizes the SDCT acting on Y', U', V' data. A modified quantization matrix $(\bar{\gamma}_{ij})$ is used. If the output of the SDCT on a p×p block is. $\bar{z}_{ij}$, the block output after scaling is $\bar{b}_{ij} = \bar{z}_{ij} \bar{\gamma}_{ij}$. The modified quantization matrix is chosen so that $b_{ij} = \bar{b}_{ij}$ for all i,j. The output of the quantized SDCT is then made approximately equal to the output of a standard system, which utilizes an RGB to YUV conversion followed by a DCT and scaling, by further modifying the quantization matrix to account for the scale factor 0.118;. That is, the modified quantization matrix $(0.118 \bar{\gamma}_{ij})$ is used. The scaling process is repeated for each of the SDCT output blocks for each of the various color planes Y', U', and V'. This process utilizes digital multipliers which have a sufficient number of bits (approximately two times the number of bits of the highest accuracy multiplicand) to maintain the accuracy of the output at a level at least as good as the accuracy associated with the multiplicands. The combination of the quantization multiplication and the factorization multiplication makes no difference in the time required to quantize the SDCT data because only a different multiplication operand, $0.118 \gamma_{ij}$, is used rather than $\gamma_{ij}$. However, the combination of the quantization multiplication and factorization multiplication (that is 0.118 as a factor) does make a large difference in the time required to perform the color conversion, because the RGB to Y'U'V' conversion can be carried out through shift and add steps as earlier illustrated.

The importance of reducing the RGB transform operation into a minimum number of shift and add operations is that shift and add operations are very fast compared to conventional multiplication operations. Furthermore, if special purpose hardware is built for implementing the color conversion, the adders and shifters are generally much less complex, and hence cheaper and less energy consuming, than multipliers. Since this conversion must be repeated for each RGB set of data corresponding to one pixel element in the two dimensional array, any time or complexity savings is multiplied by the number of pixel elements for each image transmitted. This is especially important in the transmission of video images because the data transformation must be completed for many images, for example 15 images per second of video transmission, which make up the video display. Therefore, the speed of the digital image transmission and the quality of the digital video display is substantially increased due to the increased efficiency of the RGB to Y'U'V' transformation of this embodiment of the invention.

One example of an embodiment of the present invention which uses simplified special purpose hardware is the use of a Look Up Table (LUT) for a multiplier. In this particular embodiment, RGB data is converted into Y'U'V' data and then multiplied by approximately 0.118 using a LUT. The LUT of the present embodiment only stores the product For the Y' data multiplied by 0.118 rather than products by 0.299, 0.587, and 0.114 as would be the case in a conventional LUT multiplier for an RGB to YUV conversion. Similarly, if special purpose hardware is designed for color conversion utilizing multipliers by fixed constants, then the factorization of the RGB to Y'U'V' change of color-basis matrix to the form 0.118 [B] leads to an implementation that uses only a single multiplier by the constant 0.118. This is in contrast to a standard RGB to YUV conversion with three fixed multipliers for the three constants defining the Y component.

Once the SDCT data has been quantized, the data is coded by a data coding process such as Huffman coding, converted into digital signals, and then transmitted over the data channel. Huffman coding is implemented in a look-up table which substitutes variable length code words for fixed length words of input data. Coding means can also comprise a variety of digital implementations of coding processes, such as ALUs, dedicated multipliers or shift and add units, or other special purpose devices for manipulating digital data. The data channel medium may be electrical, optical, or electromagnetic, and as a result, conversion devices which translate individual data biting into signal pulses (and vice versa) may be electrical, electro-optic, or electromagnetic devices. Similarly, data drivers (or transmitters) and data sensors (or receivers) may be electrical, optical, or electromagnetic devices.

After transmission, data is then received and decoded through an inverse coding procedure, such as in inverse Huffman coding procedure. Once the data is decoded, it must be descaled and have the inverse DCT operation performed on it in order to generate YUV form data. Once the YUV form data is generated the inverse RGB conversion can take place to generate RGB form data for display on a monitor. In many image compression applications, time and complexity savings in the inverse process is even more important than in the forward process. This is the case, for example, when image data is compressed once so that it may be transmitted and decompressed at various times by many users. Even if the compression process is difficult, if the associated decompression process is efficient then the compression and decompression processes are very useful because compressed data can the efficiently stored once and after such a storage, the efficient decompression can be used many times on the stored data. This type of data use heavily utilizes the efficiencies of the data decompression process independent of the data compression process.

The decoding means 300 of FIG. 1 is the complementary means to the coding means 200. For example, if a Huffman coding method is used in coding means 200, then a Huffman decoding means is used in decode means 300. Again, this procedure is implemented in look-up tables or other similar devices for manipulating digital data. The output of the decoding process is three M×N matrices of quantized scaled DCT data. The decode means 300 also includes the descaling and inverse scaled-DCT (ISDCT) transformation. The descaling step is only a multiplication step as opposed to a multiplication and truncation step in the quantization process. This is because once data has been truncated, then the truncated part of the data is lost and it cannot be retrieved. The multiplication step in the descaling process multiplies each of the elements in the p×p block (in this implementation, 8×8) of quantized SDCT data by a value $\beta_{ij}\delta_d$ wherein $\beta_{ij}=1/\gamma_{ij}$ which reverses the scaling of the compression process and wherein $\delta_d$, d=Y,U,V is derived from the factorization for the YUV to RGB transformation described below. After the descaling process, an ISDCT process is applied to the resulting data.

The ISDCT can be implemented in a variety of embodiments. The inverse scaled-DCT, of the present embodiment, is based on the following matrix identities:

$$C_8^{-1} = R_{8,2}{}^t M_8{}^t R_{8,1}{}^t D_8 P_8{}^t,$$

where the matrices in the above are, those defined previously, and $$(C_{8\otimes C8})^{-1} = ((R_{8,2}{}^t M_8{}^t R_{8,1}{}^t) \otimes (R_{8,2}{}^t M_8{}^t R_{8,1}{}^t))((D_8 P_8{}^t) \otimes (D_8 P_8{}^t))$$

where the superscript $^t$ denotes the matrix transpose. From these identities it can be seen that one can compute the 2-dimensional inverse scaled DCT on 8×8 points by first incorporating the product by $$(D_8 P_8{}^t) \otimes (D_8 P_8{}^t)$$

into the descaling and then computing a product by $$(R_{8,2}{}^t M_8{}^t R_{8,1}{}^t) \otimes (R_{8,2}{}^t M_8{}^t R_{8,1}{}^t).$$

The actual inverse scaled-DCT computation can be done following the formula obtained by rewriting $$(R_{8,2}{}^t M_8{}^t{}_8{}^t R_{8,1}{}^t) \otimes (R_{8,2}{}^t M_8{}^t R_{8,1}{}^t)$$

as $$(R_{8,2}{}^t \otimes R_{8,1}{}^1)(M_8{}^t \otimes M_8{}^t)(R_{8,2}{}^t \otimes R_{8,1}{}^t)$$

The pre and post-additions (products by $$(R_{8,2}{}^t \otimes R_{8,2}{}^t)$$

and $$(R_{8,1}{}^t \otimes R_{8,1}{}^t))$$

are done in row-column fashion with 128 and 288 additions respectively. The core of the 8×8: inverse scaled DCT is the computation of the product $$M_8{}^t \otimes M_8{}^t,$$

which will not be done in row-column fashion. Rather, the first, second, third and fifth columns of the 8×8 data matrix will each be multiplied by $$M_8^t.$$

Each of these will involve 2 multiplications by $\gamma(4)$ plus the product by the $$G_2^t,$$

which can be done with 3 multiplications and 3 additions. The fourth and sixth columns will be multiplied by $\gamma(4)M_8^t$. Each of these can be done with 4 multiplications by $\gamma(4)$, 2 multiplications by 2, plus the product the $\gamma(4)$ $G_2^t$, which can be done with 3 multiplications and 3 additions. The seventh and eighth columns will be handled simultaneously to account for the product by $$G_2^t \otimes M_8^t.$$

A 16-dimensional column vector is formed by interleaving the entries of the seventh and eight columns. The first, second, third and fifth pairs of entries are each multiplied by $G_2^t$, while the fourth and sixth pairs are multiplied by $\gamma(4)$ $G_2^t$. Each of these takes 3 multiplications and three additions. Finally, the seventh and eighth pairs of entries are multiplied simultaneously by $(G_2 \otimes G_2)^t$, with 2 multiplications by $\gamma(4)$, 10 additions and 2 shifts, using an algorithm based on the factorization $$(G_2 \otimes G_2)^t = \begin{pmatrix} 1 & 0 & 1 & 0 \\ 0 & 1 & 0 & 1 \\ 0 & 1 & 0 & -1 \\ -1 & 0 & 1 & 0 \end{pmatrix} \begin{pmatrix} -\gamma(4)/2 & -\gamma(4)/2 & 0 & 0 \\ \gamma(4)/2 & -\gamma(4)/2 & 0 & 0 \\ 0 & 0 & 1/2 & 0 \\ 0 & 0 & 0 & 1/2 \end{pmatrix} \begin{pmatrix} 1 & 0 & 0 & -1 \\ 0 & 1 & 1 & 0 \\ 1 & 0 & 0 & 1 \\ 0 & 1 & -1 & 0 \end{pmatrix}.$$

Altogether, the entire algorithm for the 2-dimensional inverse scaled-DCT on 8×8 points calls for 54 multiplications and 462 additions, plus 6 multiplications by ½.

This procedure can also be carried out in row-column fashion, and is essentially the reverse procedure of the SDCT process. The resulting output represents three matrices having $\tilde{Y}$, $\tilde{U}$, and $\tilde{V}$ data. The $\tilde{Y}$, $\tilde{U}$, $\tilde{V}$ matrices are not exactly identical to the YUV data which were generated at the beginning of the process because of the quantization losses but are approximately identical.

Once the $\tilde{Y}$, $\tilde{U}$, $\tilde{V}$ data has been generated, it is sent to transform means 350 for conversion to $\tilde{R}$, $\tilde{G}$, $\tilde{B}$ data. In order to efficiently perform this conversion, the conversion is factored. Specifically, the $\tilde{Y}$, $\tilde{U}$, $\tilde{V}$ to $\tilde{R}$, $\tilde{G}$, $\tilde{B}$ transform means 350 has the following form:

$$\begin{pmatrix} \tilde{R} \\ \tilde{G} \\ \tilde{B} \end{pmatrix} = [D] \begin{pmatrix} \tilde{Y} \\ \tilde{U} \\ \tilde{V} \end{pmatrix} \text{ wherein } D = \begin{pmatrix} 1 & 0 & -1 \\ 1 & 1 & .5 \\ 1 & -5 & 0 \end{pmatrix}.$$

It should be appreciated that $$[D][\Delta] = \begin{pmatrix} 1 & 0 & -1 \\ 1 & .2 & .5 \\ 1 & -1 & 0 \end{pmatrix}, \text{ wherein } [\Delta] = \begin{pmatrix} 1 & 0 & 0 \\ 0 & .2 & 0 \\ 0 & 0 & 1 \end{pmatrix},$$

which very closely approximates the standard change of color-basis matrix for the YUV to RGB color conversion. The $\tilde{R}$, $\tilde{G}$, $\tilde{B}$ matrices are not exactly identical to the RGB data which began the process because of the quantization losses but are approximately identical.

The scaling factors $\delta_d$ (referred to above) are obtained from the matrix $\Delta$ of the last equation above. Namely, $\delta_Y = \delta_V = 1$ and $\delta_U = 0.2$. The factorization illustrates that the process of incorporating the $\delta_d$ into the descaling process followed by an ISDCT transform and color conversion via the matrix $[D]$ yields a very close approximation to the process of descaling without the $\delta_d$ factors followed by an ISDCT transform and standard YUV to RGB color conversion.

The product of the column vector whose entries are $\tilde{Y}, \tilde{U}, \tilde{V}$ by the matrix $[D]$ is achieved by the following steps:

a1=$0.5\tilde{V}=0.5\tilde{V}$ shift a2=$\tilde{U}$+a1=$\tilde{U}$+$0.5\tilde{V}$ add a3=$4\tilde{U}$=$4\tilde{U}$ shift a4=$\tilde{U}$+a3=$5\tilde{U}$ add a5=$\tilde{Y}$−$\tilde{V}$=$\tilde{R}$ add a6=$\tilde{Y}$+a2=$\tilde{G}$ add a7=$\tilde{Y}$−a4=$\tilde{B}$ add This transform contains only five binary additions and two shift operations. Inverse transform means 350 is similar to transform means 150 in that the minimum shift and add operations replace costlier (that is, either slower or more complex) multiplication operations. Also, the $\delta_d$ factors are not explicitly multiplied by the color conversion because they have been implicitly incorporated into the descaling step. This is a very similar step to the factorization contained in the quantization step of the compression process wherein the scale constant 0.118 is absorbed into the quantization process. The output of the transform means 350 is $\tilde{R}$, $\tilde{G}$, $\tilde{B}$ data. If programmable hardware is used in implementing the invention, then it is identical to the hardware for general color conversion; only the programmed coefficients need to be changed. If special purpose hardware is used, than the multipliers for the quantization must be adjusted to account for the new constants.

An alternate embodiment of the present invention subsamples the output of the DCT of the chrominance data 2-to-1 in the horizantal, vertical, or both horizantal and vertical directions. That is, only every other data point is used in the subsampled direction. The operational steps a1, a2, a3, a4 in the above color conversion only act on the chrominance components, and only a5, a6, a7 act also on the luminance component. As a result, when the chrominance data is subsampled, the first four operational steps happen with significantly less frequency. For example, if the chrominance components are sampled 2-to-1 in any one direction, then the amount of chrominance data is halved. Thus the first four operational steps occur only half the time. This means that the total arithmetical operation count for the color conversion is 4 adds and 1 shift per output pixel.

This is because the 2 adds and 2 shifts of the first four steps occur at only half the frequency. Similarly, in the very common situation where the chrominance data is subsampled 2-to-1 in both directions, the total arithmetical operation count for the color conversion is 3.5 adds and 0.5 shifts per output pixel. Sub-sampling the output of the DCT in combination with the Factorization multiplication further reduces the effective number of binary additions and shift operations beyond the reductions realized by the factorization alone.

Figure 2:
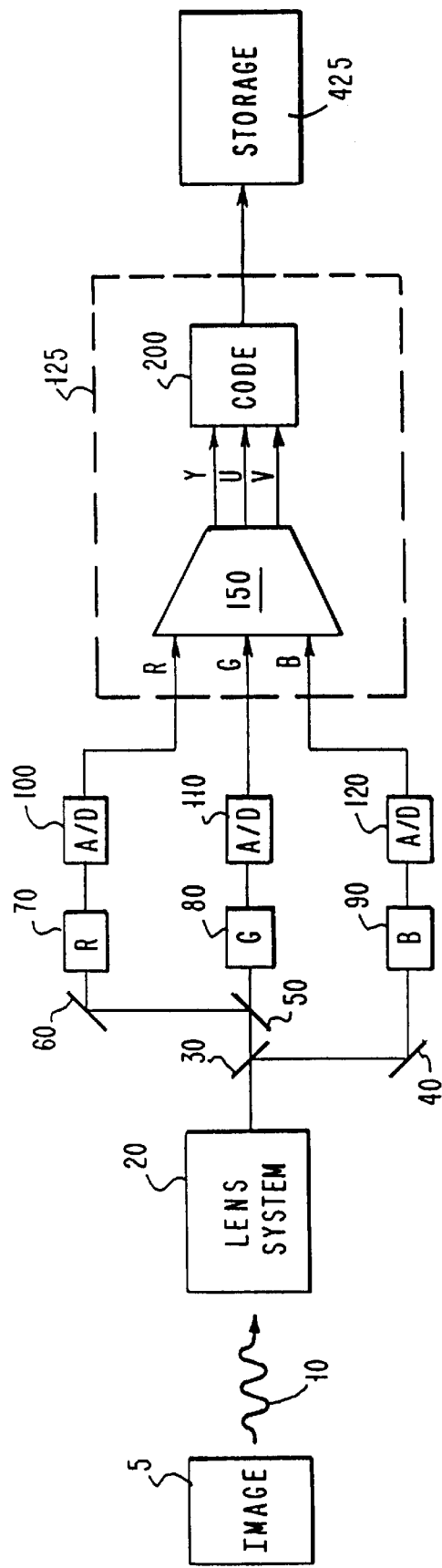
FIG. 2 illustrates a digital image processor for storing images according to the present invention.
Figure 3:
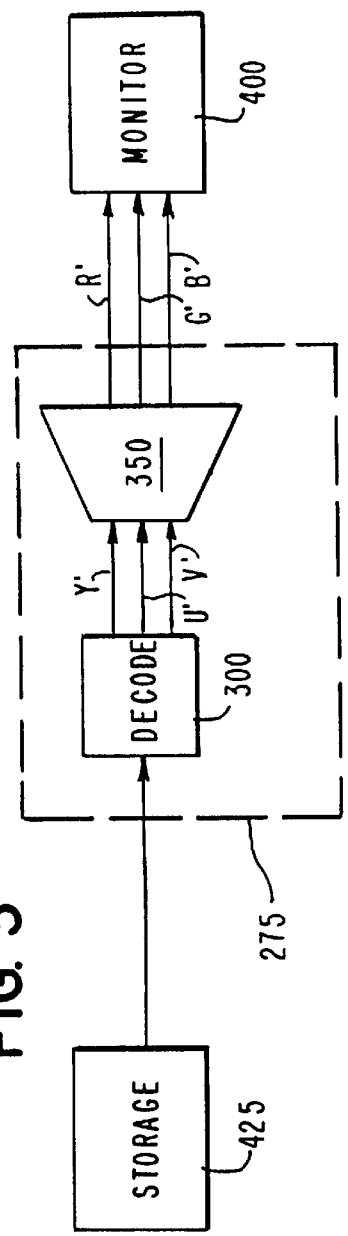
FIG. 3 illustrates a digital image processor for displaying images according to the present invention.

The forward color conversion (RGB to Y'U'V') described here can be used with conventional inverse techniques (YUV to RGB) to yield images visually identical to those processed with conventional Forward color conversion. Similarly, the inverse color conversion ($\tilde{Y}, \tilde{U}, \tilde{V}$ to $\tilde{R}, \tilde{G}, \tilde{B}$) described here can be used with conventional forward techniques (RGB to YUV) to yield images visually identical to those processed with conventional inverse color conversion. This means that the forward color conversion techniques used to implement particular transformations are separate from the techniques used to implement inverse transformation. FIG. 2 illustrates that coded data from code means 200 can be stored in storage means 425 to be used separately by other image processing systems having decoding and inverse conversion means which are different from that described here. Similarly, FIG. 3 illustrates that stored data in storage means 425, which is in coded YUV format can be decoded and converted into RGB format data for display on a monitor even though the stored data did not take advantage of the coding and forward conversion processes described in this invention. Storage means 425 in either the embodiment for storing images or displaying images according to this invention can be conventional electrical, optical, or electromagnetic storage means for storing digital data. For example, magnetic storage tapes, magnetic storage disks, tape or disk library systems, RAM, ROM, flash memory, optical disks, or other similar types of storage media are suitable storage means for this invention.

Another embodiment of the transform means 150 transforms RGB data into YCbCr wherein Cb=0.51U and Cr=0.625V. In this embodiment, the shift and add steps are identical to the shift add steps of the RGB to YUV transform. However, here the single scaling factor 0.118 is replaced by three different scaling factors, one for each color plane, to accommodate for the extra 0.5 and 0.625 factors. A diagonal matrix [F] is absorbed into the quantization operation, whereby $$[F] = 0.118 \begin{pmatrix} 1 & 0 & 0 \\ 0 & .5 & 0 \\ 0 & 0 & .625 \end{pmatrix}$$

Additionally, the inverse transform $\tilde{Y}, \tilde{Cb}, \tilde{Cr}$ to $\tilde{R}, \tilde{G}, \tilde{B}$ has the same shift and add operations as the $\tilde{Y}, \tilde{U}, \tilde{V}$ to $\tilde{R}, \tilde{G}, \tilde{B}$ inverse transform, however, the diagonal matrix [G], rather than [Δ], is absorbed into the descaling process. The diagonal matrix [G] is:

$$\begin{pmatrix} 1 & 0 & 0 \\ 0 & .4 & 0 \\ 0 & 0 & 1.6 \end{pmatrix}$$

While the invention has been described and illustrated with respect to plural embodiments thereof, it will be understood by those skilled in the art that various changes in the detail may be made therein without departing from the spirit, scope, and teaching of the invention. Therefore, the invention disclosed herein is to be limited only as specified in the following claims.

We claim:

1. A method for transmitting an image over a data channel, comprising:

organizing digital RGB data which represents said image by pixel location;

transforming said digital RGB data into digital YUV data which represents said image through an RGB to YUV transform by creating RGB signals corresponding to said digital RGB data, storing said RGB signals in storage locations, creating YUV signals corresponding to said digital YUV data by shifting and adding said RGB signals within said storage locations;

filtering said YUV signals to reduce the quantity of said storage locations containing said filtered YUV signals corresponding to said digital YUV data representing said image;

scaling said filtered YUV signals by adjusting the magnitude of said filtered YUV signals and storing said adjusted magnitudes in storage locations;

converting said scaled YUV signals for transmission over said data channel; and applying said signals to said data channel.

2. A method for transmitting an image over a data channel, as in claim 1, wherein:

said YUV signals are filtered and subsampled to reduce the quantity of said filtered YUV signals representing said image.

3. A method for transmitting an image over a data channel, as in claim 1, wherein:

a scale factor multiplied by a factored matrix forms said RGB to YUV transform; and said scaling step includes multiplying by said scale factor.

4. A method for transmitting an image over a data channel, comprising:

organizing digital RGB data which represents said image by pixel location;

transforming said digital RGB data into digital YUV data which represents said image wherein Y=2.5R+5G+B, U=2.5R+5G +7.5B, and V=-6R+5B+B by creating RGB signals corresponding to said digital RGB data, storing said RGB signals in storage locations creating YUV signals corresponding to said digital YUV data by shifting and adding parts of said RGB signals within said storage locations;

filtering said YUV signals to reduce the quantity of said storage locations containing said YUV signals corresponding to said YUV digital data representing said image;

scaling said filtered YUV signals by adjusting the magnitude of said filtered YUV signals;

converting said scaled YUV signals into signals for transmission over said data channel; and applying said signals to said data channel.

5. A method for transmitting an image over a data channel, as in claim 4, wherein:

said YUV signals are filtered and subsampled to reduce the quantity of said YUV signals representing said image.

6. A method for transmitting an image over a data channel, as in claim 4, wherein:

said scaling process absorbs a constant having a value of approximately 0.118.

7. A method for transmitting an image over a data channel, as in claim 4, wherein:
said scaling process includes multiplying by approximately $$0.118 \begin{pmatrix} 1 & 0 & 0 \\ 0 & .5 & 0 \\ 0 & 0 & .625 \end{pmatrix}.$$

8. A method for transmitting an image over a data channel, as in claim 6, wherein:
said RGB to YUV transformation process is composed of right shifting R data one binary position;
adding G data to said shifted R data to obtain an intermediate value $\lambda 1$;
left shifting said $\lambda 1$ value two binary positions;
adding said left shifted $\lambda 1$ value to said $\lambda 1$ value to obtain an intermediate value $\lambda 2$;
adding said $\lambda 2$ value to B data to obtain a value value Y;
left shifting said R data three binary positions;
adding said left shifted R data to said right shifted R data to obtain an intermediate value $\lambda 3$;
adding said Y value to a negative $\lambda 3$ to obtain a value U;
left shifting said B data three binary positions;
right shifting said B data one binary position;
adding said left shifted B data to said right shifted B data to obtain an intermediate value $\lambda 4$; and
adding said Y value to a negative $\lambda 4$ to obtain a value V.

9. A method for transmitting an image over a data channel, as in claim 7, wherein:
said RGB to YUV transformation process is composed of right shifting R data one binary position;
adding G data to said shifted R data to obtain an intermediate value $\lambda 1$;
left shifting said $\lambda 1$ value two binary positions;
adding said left shifted $\lambda 1$ value to said $\lambda 1$ value to obtain an intermediate value $\lambda 2$;
adding said $\lambda 2$ value to B data to obtain a value value Y;
left shifting said R data three binary positions;
adding said left shifted R data to said right shifted R data to obtain an intermediate value $\lambda 3$;
adding said Y value to a negative $\lambda 3$ to obtain a value U;
left shifting said B data three binary positions;
right shifting said B data one binary position;
adding said left shifted B data to said right shifted B data to obtain an intermediate value $\lambda 4$; and
adding said Y value to a negative $\lambda 4$ to obtain a value V.

10. A method for displaying an image, comprising:
sensing signals from a data channel;
decoding said sensed signals into YUV signals corresponding to digital YUV data and storing said YUV signals in storage locations;
descaling said stored YUV signals by adjusting the magnitude of said stored YUV signals and storing said adjusted magnitudes in storage locations;
transforming said digital YUV data into digital RGB data through a YUV to RGB transform by creating YUV signals corresponding to said digital YUV data, storing said YUV signals in storage locations, creating RGB signals corresponding to said digital RGB data by shifting and adding said YUV signals within storage locations; and
displaying said RGB data on a display means.

11. A method for displaying an image, as in claim 10, wherein:
a diagonal matrix multiplied by a factored matrix forms said YUV to RGB transform; and
said descaling step includes multiplying by said diagonal matrix.

12. A method for displaying an image, comprising:
sensing signals of digital YUV data from a data channel;
decoding said sensed signals into YUV signals corresponding to digital YUV data and storing said YUV digital signals in storage locations;
descaling said digital YUV data;
transforming said digital YUV data into RGB digital data through a YUV to RGB transform wherein R=Y−V, G=Y+U+0.5V, and B=Y−5U by creating YUV signals corresponding to said digital YUV data, storing said YUV signals in storage locations, creating digital RGB data by shifting and adding said YUV signals within storage locations; and
displaying said digital RGB data on a display means.

13. A method for displaying an image, as in claim 12 wherein;
said descaling process includes multiplying by $$[\Delta] = \begin{pmatrix} 1 & 0 & 0 \\ 0 & .2 & 0 \\ 0 & 0 & 1 \end{pmatrix}$$

14. A method for displaying an image, as in claim 12 wherein;
said descaling process includes multiplying by $$[\Delta] = \begin{pmatrix} 1 & 0 & 0 \\ 0 & .4 & 0 \\ 0 & 0 & 1.6 \end{pmatrix}.$$

15. A method of displaying an image, as in claim 13, wherein;
said YUV to RGB transform is composed of right shifting said V data one binary position;
adding said U data to said right shifted V data to obtain an intermediate value $\lambda 1$;
left shifting said U data two binary positions;
adding said U data to said left shifted U data to obtain an intermediate value $\lambda 2$;
adding said Y data to negative V data to obtain a R value;
adding said Y data to said $\lambda 1$ to obtain a G value; and
adding said Y data to a negative $\lambda 2$ to obtain a B value.

16. A method of displaying an image, as in claim 14, wherein;
said YUV to RGB transform is composed of right shifting said V data one binary position;
adding said U data to said right shifted V data to obtain an intermediate value $\lambda 1$;
left shifting said U data two binary positions;
adding said U data to said left shifted U data to obtain an intermediate value $\lambda 2$;
adding said Y data to negative V data to obtain a R value;
adding said Y data to said $\lambda 1$ to obtain a G value; and
adding said Y data to a negative $\lambda 2$ to obtain a B value.

17. A transmitter for transmitting an image over a data channel, comprising:

a transformer means for transforming digital RGB data into digital YUV data which represents said image by creating RGB signals corresponding to said digital RGB data, storing said RGB signals in storage locations, creating YUV signals corresponding to said digital YUV data by shifting and adding parts of said RGB signals within said storage locations;

a filter means for filtering said YUV signals to reduce the quantity of said storage locations containing said YUV signals corresponding to said digital YUV data representing said image;

a scaling means for scaling said filtered YUV signals by adjusting the magnitude of said filtered YUV signals and storing said adjusted magnitudes in storage locations;

a conversion means for converting said scaled YUV signals into signals for transmission over said data channel; and a driver means for applying said signals to said data channel.

18. A transmitter for transmitting an image over a data channel, as in claim 17, wherein:

said UV data is filtered and subsampled to reduce the quantity of data representing said image.

19. A transmitter for transmitting an image over a data channel, as in claim 17, wherein:

said RGB to YUV transformation includes a scale factor multiplied by a factored matrix;

said transformer means multiplies said RGB data by said factored matrix; and said scaling means includes multiplying by said scale factor.

20. A transmitter for transmitting an image over a data channel, comprising:

a transformer means for transforming digital RGB data into digital YUV data which represents said image wherein said transformer means generates Y=2.5R+5G+B, U=2.5R+5G−7.5 B, and V=−6R+5G+B by creating RGB signals corresponding to said digital RGB data, storing said RGB signals in storage locations, creating YUV signals corresponding to said digital YUV data by shifting and adding parts of said RGB signals within said storage locations;

filter means for creating filtered YUV signals by filtering said YUV signals to reduce the quantity of data representing said image;

scaling means for scaling said filtered YUV signals to reduce the magnitude of said filtered YUV signals to create scaled YUV signals conversion means for converting said scaled YUV signals into signals for transmission over said data channel; and driver means for applying said signals to said data channel.

21. A transmitter for transmitting an image over a data channel, as in claim 20, wherein:

said UV data is filtered and subsampled to reduce the quantity of data representing said image.

22. A transmitter for transmitting an image over a data channel, as in claim 20, wherein:

said scaling means includes multiplying by scale factor of approximately 0.118.

23. A transmitter for transmitting an image over a data channel, as in claim 20, wherein:

said scaling means includes multiplying by $$0.118 \begin{pmatrix} 1 & 0 & 0 \\ 0 & .5 & 0 \\ 0 & 0 & .625 \end{pmatrix}.$$

24. A transmitter for transmitting an image over a data channel, as in claim 22, wherein:

said transform means right shifts R data one binary position;

said transform means adds G data to said shifted R data to obtain an intermediate value $\lambda 1$;

said transform means left shifts said $\lambda 1$ value two binary positions;

said transform means adds said left shifted $\lambda 1$ value to said $\lambda 1$ value to obtain an intermediate value $\lambda 2$;

said transform means adds said $\lambda 2$ value to B data to obtain a final value value Y;

said transform means left shifts said R data three binary positions;

said transform means adds said left shifted R data to said right shifted R data to obtain an intermediate value $\lambda 3$;

said transform means adds said Y value to a negative $\lambda 3$ to obtain a final value U;

said transform means left shifts said B data three binary positions;

said transform means right shifts said B data one binary position;

said transform means adds said left shifted B data to said right shifted B data to obtain an intermediate value $\lambda 4$; and said transform means adds said Y value to a negative $\lambda 4$ to obtain a final value V.

25. A transmitter for transmitting an image over a data channel, as in claim 23, wherein:

said transform means right shifts R data one binary position;

said transform means adds G data to said shifted R data to obtain an intermediate value $\lambda 1$;

said transform means left shifts said $\lambda 1$ value two binary positions;

said transform means adds said left shifted $\lambda 1$ value to said $\lambda 1$ value to obtain an intermediate value $\lambda 2$;

said transform means adds said $\lambda 2$ value to B data to obtain a final value value Y;

said transform means left shifts said R data three binary positions;

said transform means adds said left shifted R data to said right shifted R data to obtain an intermediate value $\lambda 3$;

said transform means adds said Y value to a negative $\lambda 3$ to obtain a final value U;

said transform means left shifts said B data three binary positions;

said transform means right shifts said B data one binary position;

said transform means adds said left shifted B data to said right shifted B data to obtain an intermediate value $\lambda 4$; and said transform means adds said Y value to a negative $\lambda 4$ to obtain a final value V.

26. A display system for displaying an image, comprising:

a sensor means for sensing signals from a data channel;

decoding means for decoding said sensed signals into digital YUV data and storing said digital YUV data in storage locations;

a descaling means for descaling said digital YUV data by adjusting the magnitude of said digital YUV data and storing said adjusted magnitudes in storage locations;

a transform means for transforming said digital YUV data into RGB digital data by creating YUV signals corresponding to said digital YUV data, storing said YUV signals in storage locations, creating RGB digital data by shift and adding said YUV signals within said storage locations; and display means for displaying said RGB data.

27. A display system for displaying an image, as in claim 26, wherein:

said YUV to RGB transformation multiplies a diagonal matrix by a factored matrix;

said transform means multiplies said YUV data by said factored matrix; and said descaling means includes multiplying by said diagonal matrix.

28. A display system for displaying an image, comprising:

sensor means for sensing signals from a data channel;

decoding means for decoding said sensed signals into digital YUV data and storing said digital YUV data in storage locations;

descaling means for descaling said digital YUV data;

transform means for transforming said digital YUV data into digital RGB data wherein R=Y−V, G=Y=U+0.5V, and B=Y=U, by creating YUV signals corresponding to said digital YUV data, storing said YUV signals in storage locations, creating RGB signals corresponding to said digital RGB data by shifting and adding said YUV signals within said storage locations; and display means for displaying said digital RGB data.

29. A display system for displaying an image, as in claim 28 wherein;

said descaling means includes multiplying by $$[\Delta] = \begin{pmatrix} 1 & 0 & 0 \\ 0 & .2 & 0 \\ 0 & 0 & 1 \end{pmatrix}.$$

30. A display system for displaying an image, as in claim 28 wherein;

said descaling means includes multiplying by $$[\Delta] = \begin{pmatrix} 1 & 0 & 0 \\ 0 & .4 & 0 \\ 0 & 0 & 1.6 \end{pmatrix}.$$

31. A display means for displaying an image, as in claim 29, wherein;

said transform means right shirts said V data one binary position;

said transform means adds said U data to said right shifted V data to obtain an intermediate value λ1;

said transform means left shifts said U data two binary positions;

said transform means adds said U data to said left shifted U data to obtain an intermediate value λ2;

said transform means adds said Y data to negative V data to obtain a final R value;

said transform means adds said Y data to said λ1 to obtain a final G value; and said transform means adds said Y data to a negative λ2 to obtain a final B value.

32. A display system for displaying an image, as in claim 30, wherein;

said transform means right shifts said V data one binary position;

said transform means adds said U data to said right shifted V data to obtain an intermediate value λ1;

said transform means left shifts said U data two binary positions;

said transform means adds said U data to said left shifted U data to obtain an intermediate value λ2;

said transform means adds said Y data to negative V data to obtain a final R value;

said transform means adds said Y data to said λ1 to obtain a final G value; and said transform means adds said Y data to a negative λ2 to obtain a final B value.

33. A method for storing an image, comprising:

organizing digital RGB data which represents said image by pixel location;

transforming said digital RGB data into digital YUV data which represents said image through an RGB to YUV transform by creating RGB signals corresponding to said digital RGB data, storing said RGB signals in storage locations, creating YUV signals corresponding to said digital YUV data by shifting and adding parts of said RGB signals within said storage locations;

filtering said YUV signals to create filtered YUV signals to reduce the quantity of said storage locations containing YUV signals corresponding to said digital YUV data representing said image;

scaling said filtered YUV signals by adjusting the magnitude of said filtered YUV signals and storing said adjusted magnitudes in storage locations; and applying said signals to a signal storage means.

34. A method for storing an image, as in claim 33, wherein:

said UV data is filtered and subsampled to reduce the quantity of data representing said image.

35. A method for storing an image, as in claim 33, wherein:

a scale factor multiplied by a factored matrix forms said RGB to YUV transform; and said scaling step includes multiplying by said scale factor.

36. A method for storing an image, comprising:

organizing digital RGB data which represents said image by pixel location;

transforming said digital RGB data into digital YUV data which represents said image wherein Y=−6R+5G+B by creating RGB signals corresponding to said digital RGB data, storing said RGB signals in storage locations, creating YUV signals corresponding to said digital YUV data by shifting and adding parts of said RGB signals within said storage locations;

filtering said YUV signals to create filtered YUV signals to reduce the quantity of said storage locations containing said YUV signals corresponding to said digital YUV data representing said image;

scaling said filtered YUV signals by adjusting the magnitude of said filtered YUV signals and storing said adjusted magnitudes in storage locations;

converting said scaled YUV signals into signals to be stored; and applying said signals to a storage means.

37. A method for storing an image, as in claim 36, wherein:
said UV data is filtered and subsampled to reduce the quantity of data representing said image.

38. A method for storing an image, as in claim 36, wherein:
said scaling process includes multiplying by a constant having a value of approximately 0.118.

39. A method for storing an image, as in claim 36, wherein:
said scaling process includes multiplying by $$0.118 \begin{pmatrix} 1 & 0 & 0 \\ 0 & .5 & 0 \\ 0 & 0 & .625 \end{pmatrix}.$$

40. A method for storing an image, as in claim 38, wherein:
said RGB to YUV transformation process is composed of right shifting R data one binary position;
adding G data to said shifted R data to obtain an intermediate value $\lambda 1$;
left shifting said $\lambda 1$ value two binary positions;
adding said left shifted $\lambda 1$ value to said $\lambda 1$ value to obtain an intermediate value $\lambda 2$;
adding said $\lambda 2$ value to B data to obtain a final value value Y;
left shifting said R data three binary positions;
adding said left shifted R data to said right shifted R data to obtain an intermediate value $\lambda 3$;
adding said Y value to a negative $\lambda 3$ to obtain a final value U;
left shifting said B data three binary positions;
right shifting said B data one binary position;
adding said left shifted B data to said right shifted B data to obtain an intermediate value $\lambda 4$; and
adding said Y value to a negative $\lambda 4$ to obtain a final value V.

41. A method for storing an image, as in claim 39, wherein:
said RGB to YUV transformation process is composed of right shifting R data one binary position;
adding G data to said shifted R data to obtain an intermediate value $\lambda 1$;
left shifting said $\lambda 1$ value two binary positions;
adding said left shifted $\lambda 1$ value to said $\lambda 1$ value to obtain an intermediate value $\lambda 2$;
adding said $\lambda 2$ value to B data to obtain a value value Y;
left shifting said R data three binary positions;
adding said left shifted R data to said right shifted R data to obtain an intermediate value $\lambda 3$;
adding said Y value to a negative $\lambda 3$ to obtain a value U;
left shifting said B data three binary positions;
right shifting said B data one binary position;
adding said left shifted B data to said right shifted B data to obtain an intermediate value $\lambda 4$; and
adding said Y value to a negative $\lambda 4$ to obtain a value V.

42. A storage system for storing an image, comprising:
a transformer means for transforming digital RGB into digital YUV data which represents said image by creating RGB signals corresponding to said digital RGB data, storing said RGB signals in storage locations, creating YUV signals corresponding to said digital RGB data, storing said RGB signals in storage locations, creating YUV signals corresponding to said digital YUV data by shifting and adding parts of said RGB signals within said storage locations;
a filter means for filtering said YUV signals to create filtered YUV signals to reduce the quantity of said storage locations containing said YUV signals corresponding to said digital YUV data representing said image;
a scaling means for scaling said filtered YUV signals by adjusting the magnitude of said filtered YUV signals and storing said adjusted magnitude in storage locations;
a conversion means for converting said scaled YUV signals into signals for storage; and
a signal storage means for storing said signals.

43. A storage system for storing an image, as in claim 42, wherein:
said UV data is filtered and subsampled to reduce the quantity of data representing said image.

44. A storage system for storing an image, as in claim 42, wherein:
said RGB to YUV transformation includes a scale factor multiplied by a factored matrix;
said transformer means multiplies said RGB data by said factored matrix; and
said scaling means includes multiplying by said scale factor.

45. A storage system for storing an image, comprising:
a transformer means for transforming digital RGB data into digital YUV data which represents said image wherein said transformer means generates Y=2.5R+5G+B, U=2.5R+5G−7.5 B, and V=−6R+5G+B by creating RGB signals corresponding to said digital RGB data, storing said RGB signals in storage locations, creating YUV signals corresponding to said digital YUV data by shifting and adding parts of said RGB signals within said storage locations;
filter means for filtering said YUV signals to create filtered YUV signals to reduce the quantity of said storage locations containing said YUV signals corresponding to said digital YUV data representing said image;
scaling means for scaling said filtered YUV signals by adjusting the magnitude of said filtered YUV signals and for storing said adjusting magnitudes in storage locations;
conversion means for converting said scaled data into signals for storage; and
a signal storage means for storing said signals.

46. A storage system for storing an image, as in claim 45, wherein:
said UV data is filtered and subsampled to reduce the quantity of data representing said image.

47. A storage system for storing an image, as in claim 45, wherein:
said scaling means includes multiplying by a scale factor of approximately 0.118.

48. A storage system for storing an image, as in claim 45, wherein:

said scaling means includes multiplying by $$0.118\begin{pmatrix} 1 & 0 & 0 \\ 0 & .5 & 0 \\ 0 & 0 & .625 \end{pmatrix}.$$

49. A storage system for storing an image, as in claim 47, wherein:
said transform means right shifts R data one binary position;
said transform means adds G data to said shifted R data to obtain an intermediate value λ1;
said transform means left shifts said λ1 value two binary positions;
said transform means adds said left shifted λ1 value to said λ1 value to obtain an intermediate value λ2;
said transform means adds said λ2 value to B data to obtain a value value Y;
said transform means left shifts said R data three binary positions;
said transform means adds said left shifted R data to said right shifted R data to obtain an intermediate value λ3;
said transform means adds said Y value to a negative λ3 to obtain a value U;
said transform means left shifts said B data three binary positions;
said transform means right shifts said B data one binary position;
said transform means adds said left shifted B data to said right shifted B data to obtain an intermediate value λ4; and
said transform means adds said Y value to a negative λ4 to obtain a value V.

50. A storage system for storing an image over a data channel, as in claim 48, wherein:
said transform means right shifts R data one binary position;
said transform means adds G data to said shifted R data to obtain an intermediate value λ1;
said transform means left shifts said λ1 value two binary positions;
said transform means adds said left shifted λ1 value to said λ1 value to obtain an intermediate value λ2;
said transform means adds said λ2 value to B data to obtain a value Y;
said transform means left shifts said R data three binary positions;
said transform means adds said left shifted R data to said right shifted R data to obtain an intermediate value λ3;
said transform means adds said Y value to a negative λ3 to obtain a value U;
said transform means left shifts said B data three binary positions;
said transform means right shifts said B data one binary position;
said transform means adds said left shifted B data to said right shifted B data to obtain an intermediate value λ4; and
said transform means adds said Y value to a negative λ4 to obtain a value V.

\* \* \* \* \*